May 20, 1952     W. B. GRIFFITH     2,597,474
DRY PIPE VALVE
Filed Sept. 23, 1948     2 SHEETS—SHEET 2
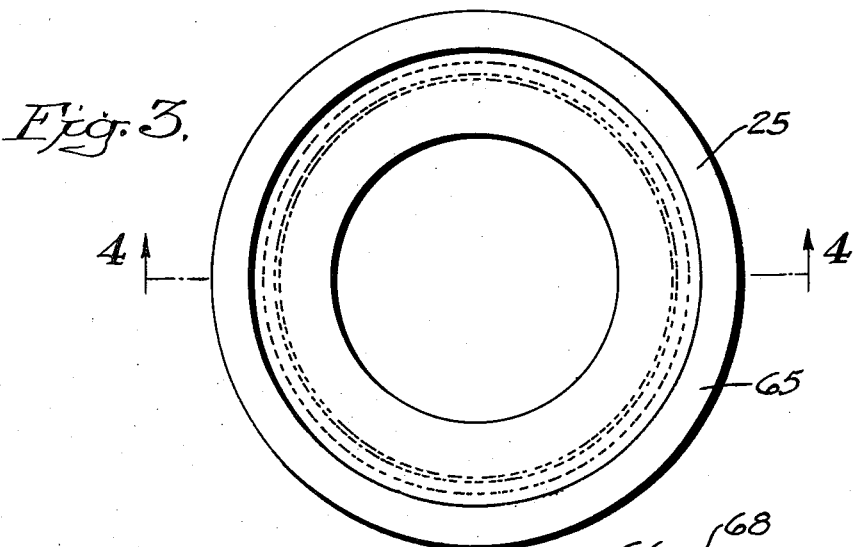
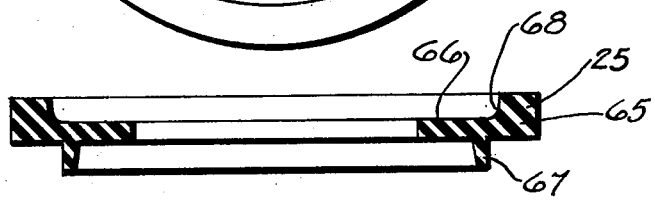
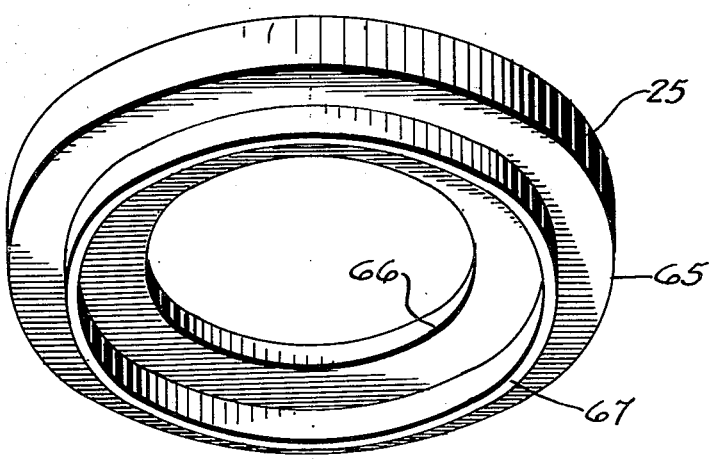
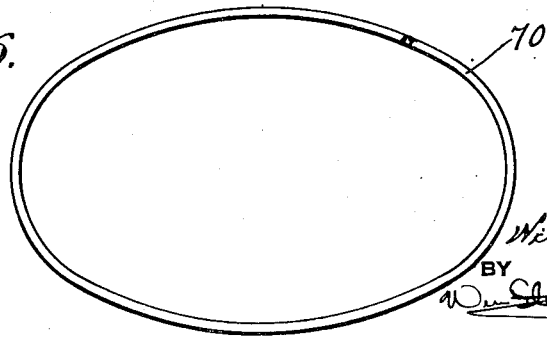
INVENTOR
William B. Griffith
BY
ATTORNEYS.

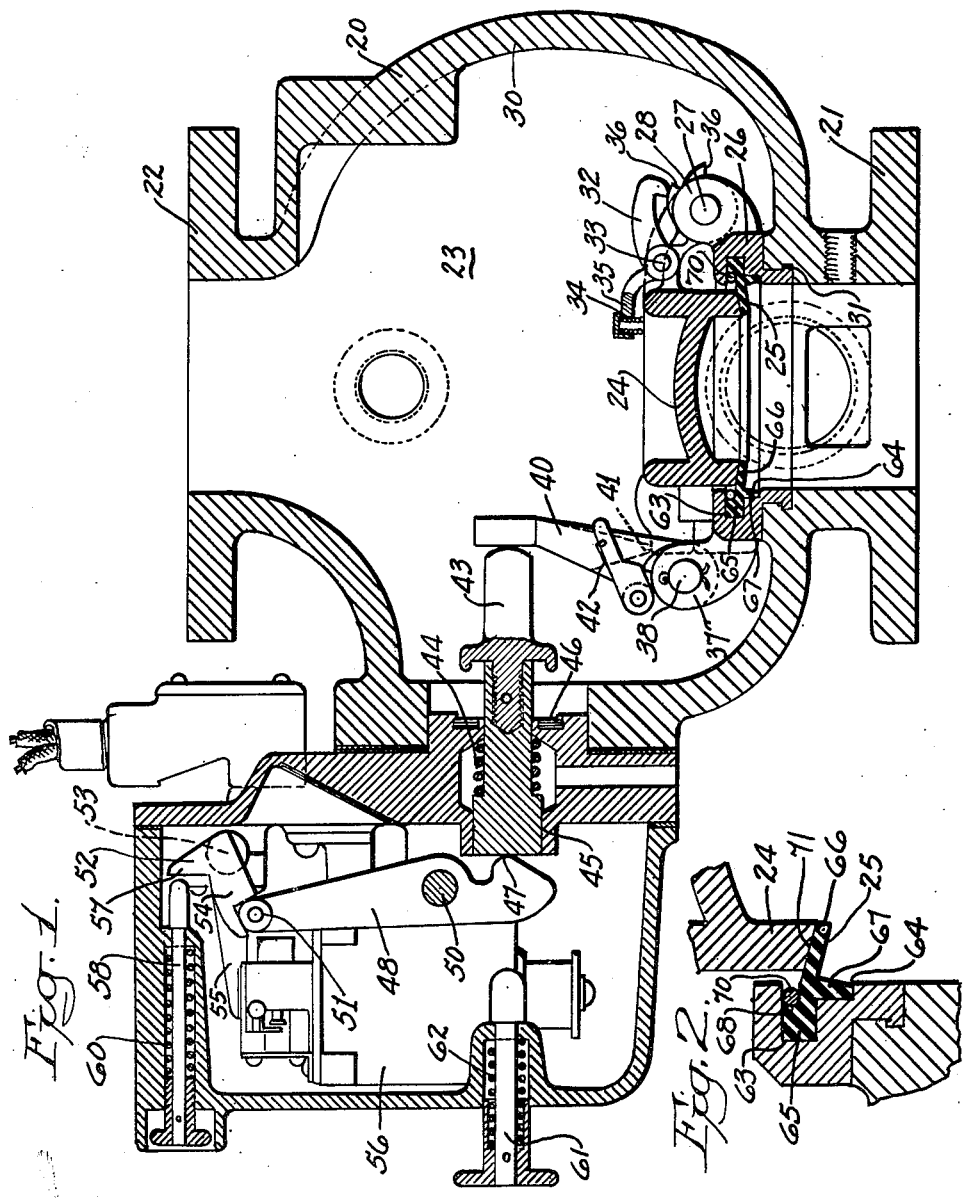

Patented May 20, 1952

2,597,474

UNITED STATES PATENT OFFICE 2,597,474

DRY PIPE VALVE

William B. Griffith, Stone Harbor, N. J.

Application September 23, 1948, Serial No. 50,838

1 Claim. (Cl. 251—167)

The present invention relates to a valve seat ring, and a valve employing the same, especially useful in fire prevention valves.

A purpose of the invention is to permit more ready replacement of a valve seat ring especially of a fire prevention valve.

A further purpose is to deflect the valve seat portion of a valve seat ring by engagement of a clapper and to increase the tightness of the seal between the valve seat ring and its holder by pressure of a skirt against the holder due to the deflection of the valve seat portion.

A further purpose is to permit the water pressure in the system to hold the skirt firmly in place.

A further purpose is to seal a valve seat ring against its holder by a spring clamping ring supplemented by a skirt which exerts pressure due to deflection of the seat and due to fluid pressure.

Further purposes appear in the specification and in the claim.

In the drawings I have chosen to illustrate one only of the numerous embodiments in which my invention may appear, choosing the forms shown from the standpoints of convenience in illustration, satisfactory operation and clear demonstration of the principles involved.

Figure 1 is a central longitudinal section of a deluge valve to which the invention has been applied.

Figure 2 is a fragmentary enlarged section of a portion of Figure 1.

Figure 3 is a top plan view of the valve seat ring according to the present invention.

Figure 4 is a section of Figure 3 on the line 4—4.

Figure 5 is a perspective of the valve seat ring.

Figure 6 is a perspective of the spring retainer.

Describing in illustration but not in limitation and referring to the drawings:

In the prior art valve seat rings as employed particularly in fire prevention valves have often been difficult to replace when they become worn or deteriorated. In my U. S. Patent No. 2,366,520 for Valve Seat Ring I have illustrated a spring retainer for holding the ring in position in the annular collar or valve seat holder. While this device represents an improvement over the devices of the prior art, there is some tendency of the pressure to cause leakage around the outside of the valve seat ring and between the ring and its holder. In accordance with the present invention this difficulty is largely overcome by supplementing the action of the spring clamping ring by sealing action exerted by the clapper itself, and by the fluid pressure. In this way when the clapper valve is closed there is more definite assurance that leakage around the valve seat ring cannot occur.

The present invention finds its best use in fire prevention valves such as dry pipe valves and deluge valves which are employed to maintain a system of fire prevention piping free from water until an emergency arises or is approaching, and then to admit water to the piping where it is required. As a typical illustration of a valve to which the invention may be applied, I illustrate in Figure 1 a deluge valve, the details of which aside from the valve seat ring holder and clapper, are of no particular significance in the present invention.

A deluge valve 20 has a flange connection 21 to the water source, the water being cut off by the valve from normally dry piping to sprinkler heads connected to a flange 22 on the opposite side of the valve. A valve chamber 23 contains a valve clapper 24 which seats against a valve seat ring 25 held by a collar or valve seat holder 26. The clapper 24 is pivoted by a pin 27 on a hinge 28 mounted on the valve seat holder in the valve chamber. The valve seat holder is secured into the valve casing 30 by engagement in a recess 31 of the casing.

The clapper carries a latch 32 pivoted thereon at 33 and spring urged toward latching position by a spring 34 engaging a projecting end 35 from the latch beyond the pivot. The latch engages a series of teeth 36 on the collar and will hold the clapper in open position until reset as required.

On the opposite end of the collar or valve seat holder 26 is a hinge 37 having a pin 38 which pivotally supports a latching lever 40, having a latch projection 41 which engages the end of the clapper remote from the pivot and holds it in closed position. Spring latch mechanism 42 tends to latch the releasing lever in its releasing position until it is reset.

The releasing lever is held in latching position by a plunger 43 spring urged by a spring 44 toward the release position and suitably extending through an opening 45 of a separate casing attached to the main housing. A bumper arrangement 46 absorbs some of the shock in case of release.

The plunger 43 is held in latching position against the action of the spring 44 by the operating end 47 of a rocker 48 fixedly pivoted at 50 and having at its outer end a roller 51 which is held in latching position by a double bell crank 52 having a fixed pivot 53. One operating arm 54 on the bell crank acts as a latch to engage the roller 51. A separate operating arm 55 engages an armature not shown of a solenoid 56 to trip the bell crank latch when the solenoid is actuated. A third operating arm 57 is capable of being tripped manually by a plunger 58 spring urged toward retraction by a spring 60. The plunger 58 passes through the auxiliary casing. A reset plunger 61 likewise extends the casing in position to engage the operating end 47 of the rocker arm 48. The reset plunger is spring retracted at 62.

It will be understood that the details of the valve can be varied to suit the particular installation.

The valve seat ring 25 occupies a relatively deep radially extending interior annular recess 63 on the valve seat ring holder and a relatively shallow annular recess 64 thereon. The shallower recess is more remote from the clapper and adjoins the deeper recess.

The valve seat ring 25 is produced from some suitable elastic material such as natural rubber or synthetic rubber of the character of neoprene (poly-chloroprene), Buna S, Buna N, or Thiokol. The valve seat ring comprises an annular body 65 which occupies the deeper recess 63 in the valve seat holder, a radially inwardly extending valve seat portion 66 mounted thereon and an axially extending skirt 67 which occupies the shallower recess 64. The skirt extends from the body at the point where the valve seat portion joins the body and extends in the opposite direction from the valve clapper. The body on its inner edge on the side of the valve seat portion opposite to the skirt has an interior annular recess 68 which receives a split spring clamp 70 of a suitable spring metal such as brass, bronze, beryllium copper, stainless steel or steel with proper corrosion protection.

It will be evident that when the valve clapper is open, the valve seat ring is held in place by the spring of the rubber and the spring of the clamping ring urging the body outwardly. When, however, the clapper is closed as best seen in Figures 1 and 2, a forward portion 71 of the clapper, which is desirably tapering in cross section, deflects the valve seat portion downwardly or away from the valve and at the same time tends to force the skirt radially outwardly assuring tight fitting of the skirt against the shallower recess 64. When now, as under normal conditions, water under pressure is present below the valve clapper, such pressure additionally tends to force the skirt outwardly and thus further protects against leakage around the outside of the valve seat ring.

Thus it will be seen that the valve seat ring is securely positioned in the valve seat holder by a combination of the spring pressure of the split ring, the radial component of the pressure of the clapper against the valve seat ring and the pressure of the water or other fluid outwardly against the skirt.

In operation it will be understood that when a valve seat ring is to be replaced, the spring split ring will be taken out, the old valve seat ring removed and a new ring inserted, after which the spring split ring will be put back in its former position. The operation of the valve itself is not influenced by the change in the relation between the valve seat ring, the valve seat ring holder and the clapper, except that, unlike previous valve seat rings, the clapper now contributes to the firmness of seating of the valve seat ring in the holder. Likewise the pressure itself contributes to such firmness of seating.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claim.

Having thus described my invention what I claim as new and desire to secure by Letters Patent is:

A valve seat holder of generally annular form having in its inner edge a relatively deep recess and an adjoining relatively shallow recess, a valve seat ring of elastic material having an annular body in the relatively deep recess, said body provided with a recess in its inner edge, and said seat ring having a valve seat portion extending radially inwardly from the body inside of the holder and having a skirt portion extending axially from the body on the side of the valve seat portion remote from the recess in the valve seat ring and occupying the shallow recess and a retaining ring in the interior recess of the body.

WILLIAM B. GRIFFITH.

REFERENCES CITED

The following references are of record in the file of this patent:

UNITED STATES PATENTS

| Number | Name | Date |
|---|---|---|
| 1,000,799 | Grimes | Aug. 15, 1911 |
| 1,619,033 | Perrenot | Mar. 1, 1927 |
| 1,898,899 | Rowley | Feb. 21, 1933 |
| 1,947,257 | Fritz | Feb. 13, 1934 |
| 2,294,105 | Wallgren | Aug. 25, 1942 |
| 2,366,520 | Griffith | Jan. 2, 1945 |

FOREIGN PATENTS

| Number | Country | Date |
|---|---|---|
| 139,056 | Austria | of 1934 |
| 226,084 | Switzerland | of 1943 |
| 268,303 | Great Britain | of 1928 |